US012800693B2

(12) United States Patent
Bhamri et al.

(10) Patent No.: US 12,800,693 B2
(45) Date of Patent: Nov. 17, 2026

(54) GENERATING A MEASUREMENT REPORT FROM POSITIONING REFERENCE SIGNALS

(71) Applicant: Lenovo (Singapore) Pte. Ltd., New Tech Park (SG)

(72) Inventors: Ankit Bhamri, Rödermark (DE); Robin Thomas, Frankfurt am Main (DE); Karthikeyan Ganesan, Kronberg im Taunus (DE); Ali Ramadan Ali, Kraiburg am Inn (DE)

(73) Assignee: Edgewood IP, Cedar Rapids, IA (US)

( * ) Notice: Subject to any disclaimer, the term of this patent is extended or adjusted under 35 U.S.C. 154(b) by 471 days.

(21) Appl. No.: 17/923,849

(22) PCT Filed: May 7, 2021

(86) PCT No.: PCT/IB2021/053913
§ 371 (c)(1),
(2) Date: Nov. 7, 2022

(87) PCT Pub. No.: WO2021/224884
PCT Pub. Date: Nov. 11, 2021

(65) Prior Publication Data

US 2023/0176162 A1 Jun. 8, 2023

Related U.S. Application Data

(60) Provisional application No. 63/021,577, filed on May 7, 2020.

(51) Int. Cl.
*G01S 5/00* (2006.01)
*H04B 17/318* (2015.01)

(52) U.S. Cl.
CPC .......... *G01S 5/0036* (2013.01); *H04B 17/318* (2015.01)

(58) Field of Classification Search
CPC .... G01S 5/0036; H04B 17/318; H04B 17/327
See application file for complete search history.

(56) References Cited

U.S. PATENT DOCUMENTS

2017/0366244 A1* 12/2017 Lee ........................ H04B 7/024
2020/0288479 A1* 9/2020 Xi ......................... H04L 5/0092
(Continued)

FOREIGN PATENT DOCUMENTS

WO 2020062150 A1 4/2020
WO 2020193853 A1 10/2020
(Continued)

OTHER PUBLICATIONS

PCT/IB2021/053913, "Notification of Transmittal of the International Search Report and the Written Opinion of the International Searching Authority, or the Declaration", International Searching Authority, Jul. 26, 2021, pp. 1-13.
(Continued)

*Primary Examiner* — Barry W Taylor
(74) *Attorney, Agent, or Firm* — Kunzler Needham Hilton

(57) ABSTRACT

Apparatuses, methods, and systems are disclosed for receiving Positioning Reference Signals ("PRS") and generating a positioning measurement report. One apparatus includes a processor and a transceiver that receives a plurality of PRS transmission from at least one base unit, each PRS being transmitted using a specific transmit beam. The processor generates a single positioning measurement report that combines measurement instances for the received plurality of PRS. Via the transceiver, the processor transmits the single positioning measurement report to a location management function ("LMF") for UE-assisted positioning.

18 Claims, 8 Drawing Sheets

(56) References Cited

U.S. PATENT DOCUMENTS

| | | | | |
|---|---|---|---|---|
| 2021/0235303 | A1* | 7/2021 | Akkarakaran | H04L 27/261 |
| 2021/0311158 | A1* | 10/2021 | Akkarakaran | H04W 4/02 |
| 2021/0314904 | A1* | 10/2021 | Duan | G01S 5/0036 |
| 2021/0320769 | A1* | 10/2021 | Cha | H04W 48/12 |
| 2021/0345201 | A1* | 11/2021 | Cheng | H04W 24/10 |
| 2022/0159415 | A1* | 5/2022 | Khoryaev | H04W 64/00 |
| 2022/0167301 | A1* | 5/2022 | Goyal | G01S 5/0236 |
| 2022/0279367 | A1* | 9/2022 | Hwang | H04L 5/0048 |
| 2023/0079891 | A1* | 3/2023 | Shreevastav | H04W 64/003<br>342/458 |
| 2023/0112322 | A1* | 4/2023 | Duan | H04W 64/00<br>455/456.1 |

FOREIGN PATENT DOCUMENTS

| | | | |
|---|---|---|---|
| WO | 2020222518 | A1 | 11/2020 |
| WO | 2020050646 | A1 | 12/2020 |

OTHER PUBLICATIONS

Nokia et al., "New WID on enhanced Industrial Internet of Things (IoT) and URLLC support", 3GPP TSG RAN Meeting #86 RP-193233, Dec. 9-12, 2019, pp. 1-5.

Intel Corporation., "New SID: Study on supporting NR from 52.6GHz to 71 GHz", 3GPP TSG RAN Meeting #86 RP-193259, Dec. 9-12, 2019, pp. 1-3.

3GPP, "3rd Generation Partnership Project; Technical Specification Group Radio Access Network; Study on NR positioning support (Release 16)", 3GPP TR 38.855 V16.0.0, Mar. 2019, pp. 1-197.

3GPP, "3rd Generation Partnership Project; Technical Specification Group Radio Access Network; Study on channel model for frequencies from 0.5 to 100 GHz (Release 16)", 3GPP TR 38.901 V16.1.0, Dec. 2019, pp. 1-101.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

* cited by examiner

GENERATING A MEASUREMENT REPORT FROM POSITIONING REFERENCE SIGNALS

CROSS-REFERENCE TO RELATED APPLICATIONS

This application claims priority to U.S. Provisional Patent Application No. 63/021,577 entitled "PRS TRANSMISSION AND REPORTING FOR HIGHER NUMBER OF BEAMS/TRPS IN FR2 AND BEYOND" and filed on May 7, 2020 for Ankit Bhamri, Robin Thomas, Karthikeyan Ganesan, and Ali Ramadan Ali, which application is incorporated herein by reference.

FIELD

The subject matter disclosed herein relates generally to wireless communications and more particularly relates to PRS transmission and reporting for higher number of beams/TRPs in FR2 and beyond.

BACKGROUND

Position Reference Signals ("PRS") may be used to enable a User Equipment ("UE") to identify its geographic location. Further, access networks may operate in frequency bands between 52.6 GHz and 71 GHz.

BRIEF SUMMARY

Disclosed are procedures for receiving PRS and generating a positioning measurement report. Said procedures may be implemented by apparatus, systems, methods, or computer program products.

One method of a UE includes receiving a plurality of Positioning Reference Signals ("PRS") from at least one base unit, each PRS being transmitted using a specific beam. The method includes generating a single positioning measurement report that combines measurement instances for the received plurality of PRS. The method further includes transmitting the single positioning measurement report to a location management function ("LMF") for UE-assisted positioning.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
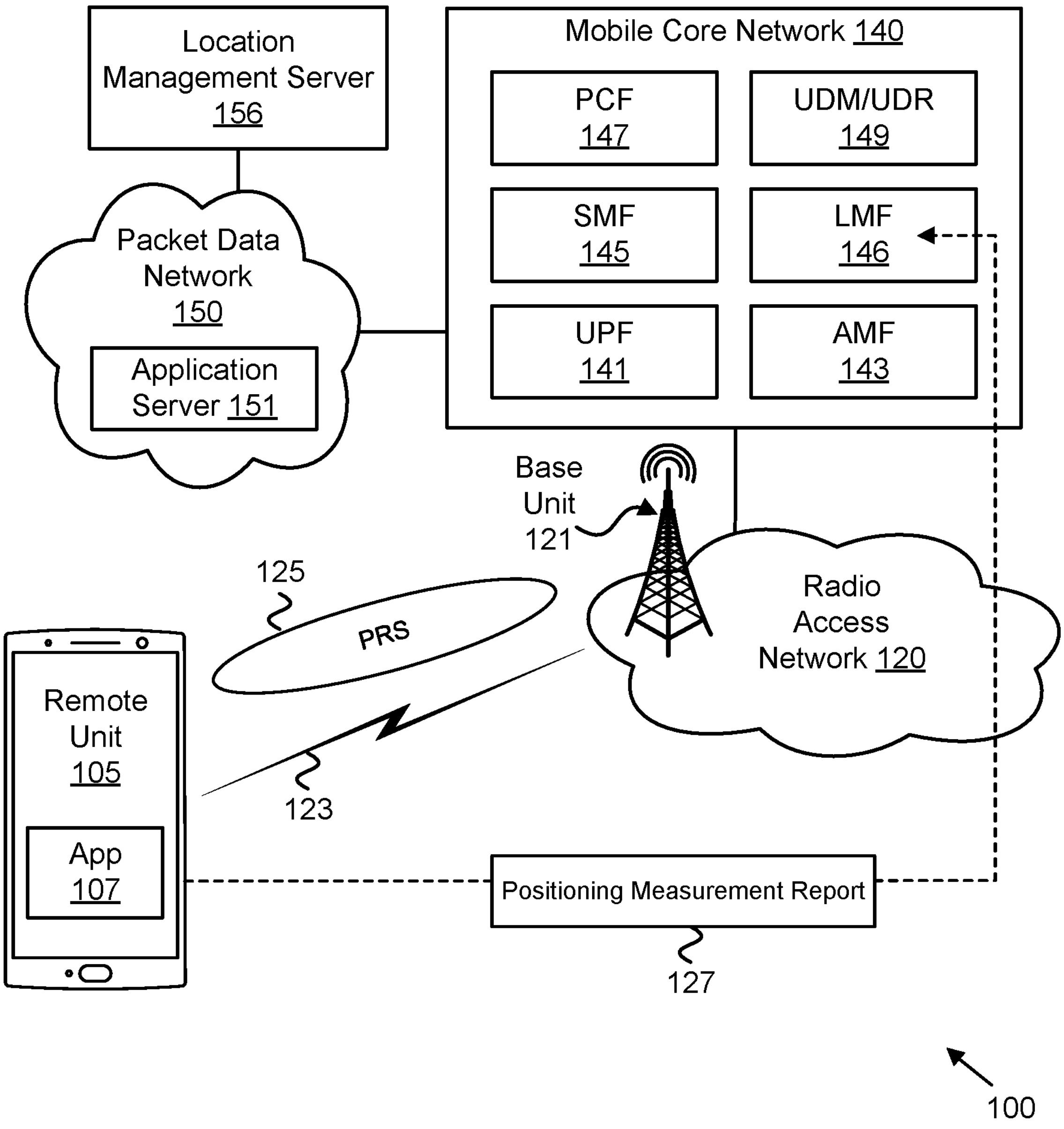
FIG. 1 is a schematic block diagram illustrating one embodiment of a wireless communication system for receiving PRS and generating a positioning measurement report.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus receiving PRS and generating a positioning measurement report. Currently in 3GPP New Radio ("NR"), a UE is configured by higher layers to receive Positioning Reference Signals ("PRS") on different PRS resources, where each PRS resource corresponds to a different Transmit ("Tx") beam/panel. The Tx beam/panel may be identified with PRS resource ID, i.e., local indexing of PRS resources (beams/panels) within a PRS resource set. A UE may also be configured with multiple PRS resource sets that are indexed locally for a transmission point.

Additionally, there may be a unique ID associated with each Transmit/Receive Point ("TRP") for configuring/indicating unique PRS resources. Once the PRS resources are configured to the UE, then the UE is expected to receive PRS on corresponding resources. For Frequency Range #2 ("FR2", i.e., frequencies from 24.25 GHz to 52.6 GHz) and beyond, the UE may be configured with a large number of PRS resources corresponding to multiple Tx beams. And once configured, the UE may be expected to receive only PRS on those resources and additionally no multiplexing with data or control on the corresponding symbols. Moreover, even repetition of PRS is supported, adding more to the overhead.

Depending upon the accuracy requirements for positioning techniques, it may be useful to have a large number of PRS resources for PRS transmission on corresponding beams, but it may not be necessary to always have such large number of positioning measurements if the positioning accuracy requirements are relatively lower. In such situation, the UE would be required to be configured with new set of PRS resources by higher layer. Therefore, it is not possible to adapt the PRS transmissions and corresponding reporting in a dynamic manner.

Disclosed herein are solutions for PRS reception in FR2 and higher bands, but also could be applicable to Frequency Range #1 ("FR1", i.e., frequencies from 410 MHz to 7125 MHz). In this disclosure, grouping of PRS resources is described, where all the PRS transmissions with multiple Tx beams on multiple PRS resources within a group can be expected by UE to be received on the same Rx beam. Based on this grouping, further UE behaviors are described:

If a UE is configured and/or indicated with grouping of PRS resources at Tx side, then the Tx may transmit only on a subset of PRS resources within the group and UE is expected to receive PRS transmission on not all the PRS beams associated with corresponding PRS resources within a same PRS group. Beneficially, this reduces the transmission overhead of PRS on multiple PRS resources when the accuracy requirements for positioning techniques are possibly lower.

If a UE is configured and/or indicated with grouping of PRS resources at Rx side, then the UE is expected to send only up to single report with positioning measurements corresponding to positioning technique for a PRS group. Alternatively, UE is expected to use one or more PRS resources belonging to the same group for generating a combined positioning measurement report instead of possible having multiple reports associated with multiple PRS resources within the same group. Beneficially, this reduces the reporting overhead when a single report can be associated with multiple PRS transmissions.

FIG. 1 depicts a wireless communication system 100 for receiving PRS and generating a positioning measurement report, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described above, the wireless communication links 123 may employ higher-frequency radio, e.g., in the 52.6

GHz to 71 GHz ranges. The remote unit 105 may receive a directional Positioning Reference Signal ("PRS") from the base unit 121.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 146, a Policy Control Function ("PCF") 147, a Unified Data Management function ("UDM") and a User Data Repository ("UDR").

The UPF(s) 141 is responsible for packet routing and forwarding, packet inspection, QoS handling, and external PDU session for interconnecting Data Network ("DN"), in the 5G architecture. The AMF 143 is responsible for termination ofNAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The LMF 146 receives measurements and assistance information from the RAN 120 and the remote unit 105 via the AMF 143 to compute the position of the remote unit 105. Here, the remote unit 105 receives at least one PRS 125 from the base unit 121. From the PRS transmission(s) 125, the remote unit 105 generates and transmits a positioning measurement report 127. The LMF 146 may configure the remote units 105 via the AMF 143. The PCF 147 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI"), while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed. Where different network slices are deployed, the mobile core network 140 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for receiving PRS and generating a positioning measurement report apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the solutions/methods described herein are also equally applicable to other mobile communication systems supporting radio communication.

In 3GPP Rel-16 NR positioning, a DL PRS Resource Set is defined as a set of DL PRS Resources, where each DL PRS Resource has a DL PRS Resource ID. Here, the DL PRS Resources in a DL PRS Resource set are associated with the same TRP. It is agreed that a DL PRS Resource ID in a DL PRS Resource set is associated with a single beam transmitted from a single TRP (A TRP may transmit one or more beams). Note: This does not have any implications on whether the TRPs and beams from which signals are transmitted are known to the UE.

The DL PRS Resource may be described by at least the following parameters:

DL PRS Resource ID (previously agreed)
Sequence ID (previously agreed)
Comb Size-N
RE Offset in frequency domain
Starting slot and symbol of DL PRS Resource
Number of symbols per DL PRS Resource (Duration of DL PRS Resource)
Quasi-colocation information (QCL with other DL reference signals)

The periodicity of DL PRS allocation is configured per DL PRS Resource Set, i.e., all DL PRS Resources of a given set have the same periodicity. In some embodiments, multiple DL PRS Resource Sets may be configured per TRP. In certain embodiments, the following periodicity values for periodicity of DL PRS allocation are supported: P={4, 8, 16, 32, 64, 5, 10, 20, 40, 80, 160, 320, 640, 1280, 2560, 5120, 10240, 20480} slots.

The parameter DL-PRS-ResourceRepetitionFactor may be configured for a DL PRS Resource Set and controls how many times each DL-PRS Resource is repeated for a single instance of the DL-PRS Resource Set. Possible values include: 1, 2, 4, 6, 8, 16, 32.

In some embodiments, an ID may be defined that can be associated with multiple DL PRS Resource Sets associated with a single TRP. This ID may be used along with a DL PRS Resource Set ID and a DL PRS Resources ID to uniquely identify a DL PRS Resource. Each TRP is only to be associated with one such ID.

Regarding PRS reception procedure, the UE can be configured with one or more DL PRS resource set configuration(s) as indicated by the higher layer parameters DL-PRS-ResourceSet and DL-PRS-Resource. Each DL PRS resource set consists of $K\geq1$ DL PRS resource(s) where each has an associated spatial transmission filter The UE can be configured with one or more DL PRS Positioning Frequency Layer configuration(s) as indicated by the higher layer parameter DL-PRS-PosnioningFrequencyLayer. A DL PRS Positioning Frequency Layer is defined as a collection of DL PRS Resource Sets which have common parameters configured by DL-PRS-PositioningFrequencyLayer.

The UE assumes that the following parameters for each DL PRS resource(s) are configured via higher layer parameters DL-PRS-PositioningFrequencyLayer, DL-PRS-ResourceSet and DL-PRS-Resource.

A positioning frequency layer consists of one or more PRS resource sets and it is defined by: 1) DL-PRS-SubcarrierSpacing defines the subcarrier spacing for the DL PRS resource; 2) DL-PRS-CyclicPrefix defines the cyclic prefix for the DL PRS resource; 3) DL-PRS-PointA defines the absolute frequency of the reference resource block. Its lowest subcarrier is also known as Point A. All DL PRS Resources and DL PRS Resource sets in the same DL-PRS-PositioningFrequencyLayer have the same value of DL- PRS-SubcarrierSpacing. The supported values of DL-PRS-SubcarrierSpacing are given in Table 4.2-1 of 3GPP TS 38.211.

All DL PRS Resources and DL PRS Resource sets in the same DL-PRS-PositioningFrequencyLayer have the same value of DL-PRS-CyclicPrefix. The supported values of DL-PRS-CyclicPrefix are given in Table 4.2-1 of 3GPP TS 38.211. All DL PRS resources belonging to the same DL PRS Resource Set have common Point A and all DL PRS Resources sets belonging to the same DL-PRS-Positioning-FrequencyLayer have a common Point A.

The UE expects that it will be configured with [IDs] each of which is defined such that it is associated with multiple DL PRS Resource Sets from the same cell. The UE expects that one of these [IDs] along with a DL-PRS-ResourceSetId and a DL-PRS-ResourceId can be used to uniquely identify a DL PRS Resource.

A PRS resource set consists of one or more PRS resources and it may be defined by:

DL-PRS-ResourceSetId defines the identity of the DL PRS resource set configuration.

DL-PRS-Periodicity defines the DL PRS resource periodicity and takes values $$T_{per}^{PRS} \in$$

$2^{\mu}\{4, 8, 16, 32, 64, 5, 10, 20, 40, 80, 160, 320, 640, 1280, 2560, 5120, 10240, 20480\}$ slots, where $\mu=0, 1, 2, 3$ for DL-PRS-SubcarrierSpacing=15, 30, 60 and 120 kHz respectively.

$$T_{per}^{PRS} = 2^{\mu} \cdot 20480$$

is not supported for $\mu=0$. All the DL PRS resources within one resource set are configured with the same periodicity.

DL-PRS-ResourceRepetitionFactor defines how many times each DL-PRS resource is repeated for a single instance of the DL-PRS resource set and takes values $$T_{per}^{PRS} \in \{1, 2, 4, 6, 8, 16, 32\}, .$$

All the DL PRS resources within one resource set have the same ResourceRepetitionFactor DL-PRS-ResourceTimeGap defines the offset in number of slots between two repeated instances of a DL PRS resource with the same DL-PRS-ResourceID within a single instance of the DL PRS resource set and takes values $$T_{gap}^{PRS} \in \{1, 2, 4, 6, 8, 16, 32\}.$$

The UE only expects to be configured with DL-PRS-ResourceTimeGap if DL-PRS-ResourceRepetitionFactor is configured with value greater than 1. The time duration spanned by one instance of a DL-PRS-ResourceSet is not expected to exceed the configured value of DL-PRS-Periodicity. All the DL PRS resources within one resource set have the same DL-PRS-ResourceTimeGap.

DL-PRS-MutingPattern defines a bitmap of the time locations where the DL PRS resource is expected to not be transmitted for a DL PRS resource set. The bitmap size can be {2, 4, 8, 16, 32} bits long. The bitmap has two options for applicability. In the first option each bit in the bitmap corresponds to a configurable number of consecutive instances of a DL-PRS-ResourceSet where all the DL-PRS-Resources within the set are muted for the instance that is indicated to be muted. In the second option each bit in the bitmap corresponds to a single repetition index for each of the DL-PRS-Resources within each instance of a DL-PRS-ResourceSet and the length of the bitmap is equal to DL-PRS-ResourceRepetitionFactor. Both options may be configured at the same time in which case the logical AND operation is applied to the bit maps.

DL-PRS-SFN0-Offset defines the time offset of the SFN0 slot 0 for the transmitting cell with respect to SFN0 slot 0 of DL-PRS-ResourceSetSlotOffset defines the slot offset with respect to SFN0 slot 0 and takes values $$T_{offset}^{PRS} \in \{0, 1, \ldots, T_{per}^{PRS} - 1\}.$$

DL-PRS-CombSizeN defines the comb size of a DL PRS resource. All DL PRS resource sets belonging to the same positioning frequency layer have the same value of DL-PRS-combSizeN.

DL-PRS-ResourceBandwidth defines the number of resource blocks configured for PRS transmission. The parameter has a granularity of 4 PRBs with a minimum of 24 PRBs and a maximum of 272 PRBs. All DL PRS resources sets within a positioning frequency layer have the same value of DL-PRS-ResourceBandwidth.

A PRS resource may be defined by:

DL-PRS-ResourceList determines the DL PRS resources that are contained within one DL PRS resource set.

DL-PRS-ResourceId determines the DL PRS resource configuration identity. All DL PRS resource IDs are locally defined within a DL PRS resource set.

DL-PRS-SequenceId is used to initialize $c_{init}$ value used in pseudo random generator for generation of DL PRS sequence for a given DL PRS resource.

DL-PRS-ReOffset defines the starting RE offset of the first symbol within a DL PRS resource in frequency. The relative RE offsets of the remaining symbols within a DL PRS resource are defined based on the initial offset.

DL-PRS-ResourceSlotOffset determines the starting slot of the DL PRS resource with respect to corresponding DL-PRS-ResourceSetSlotOffset DL-PRS-ResourceSymbolOffset determines the starting symbol of the DL PRS resource within the starting slot.

DL-PRS-NumSymbols defines the number of symbols of the DL PRS resource within a slot.

DL-PRS-QCL-Info defines any quasi-colocation information of the DL PRS resource with other reference signals. The DL PRS may be configured to be 'QCL-Type-D' with a DL PRS or SS/PBCH Block from a serving cell or a non-serving cell. The DL PRS may be configured to be 'QCL-Type-C' with a SS/PBCH Block from a serving or non-serving cell. If the DL PRS is configured as both 'QCL-Type-C' and 'QCL-Type-D' with a SS/PBCH Block, then the SSB index indicated should be the same.

DL-PRS-StartPRB defines the starting PRB index of the DL PRS resource with respect to reference Point A. The starting PRB index has a granularity of one PRB with a minimum value of 0 and a maximum value of 2176 PRBs. All DL PRS Resource Sets belonging to the same Positioning Frequency Layer have the same value of Start PRB.

For DL UE positioning measurement reporting in higher layer parameters DL-PRS-RstdMeasurementInfo or DL-PRS-UE-Rx-Tx-MeasurementInfo the UE can be configured to report the DL PRS resource ID(s) or the DL PRS resource set ID(s) associated with the DL PRS resource(s) or the DL PRS resource set(s) which are used in determining the UE measurements DL RSTD, UE Tx-Rx time difference or the DL PRS-RSRP.

The UE can be configured in higher layer parameter UE Rx-Tx Time-MeasRequestInfo to report multiple UE Rx-Tx time difference measurements corresponding to a single configured SRS resource or resource set for positioning. Each measurement corresponds to a single received DL PRS resource or resource set which can be in difference positioning frequency layers.

The UE may be configured to report, subject to UE capability, up to 4 DL RSTD measurements per pair of cells with each measurement between a different pair of DL PRS resources or DL PRS resource sets within the DL PRS configured for those cells. The up to 4 measurements being performed on the same pair of cells and all DL RSTD measurements in the same report use a single reference timing.

The UE may be configured to measure and report up to 8 DL PRS RSRP measurements on different DL PRS resources from the same cell. When the UE reports DL PRS RSRP measurements from one DL PRS resource set, the UE may indicate which DL PRS RSRP measurements have been performed using the same spatial domain filter for reception.

If the UE is configured with DL-PRS-QCL-Info and the QCL relation is between two DL PRS resources, then the UE assumes those DL PRS resources are from the same cell. If DL-PRS-QCL-Info is configured to the UE with QCL-Type-D' with a source DL-PRS-Resource then the DL-PRS-ResourceSetId and the DL-PRS-ResourceId of the source DL-PRS-Resource are expected to be indicated to the UE.

Figure 2A:
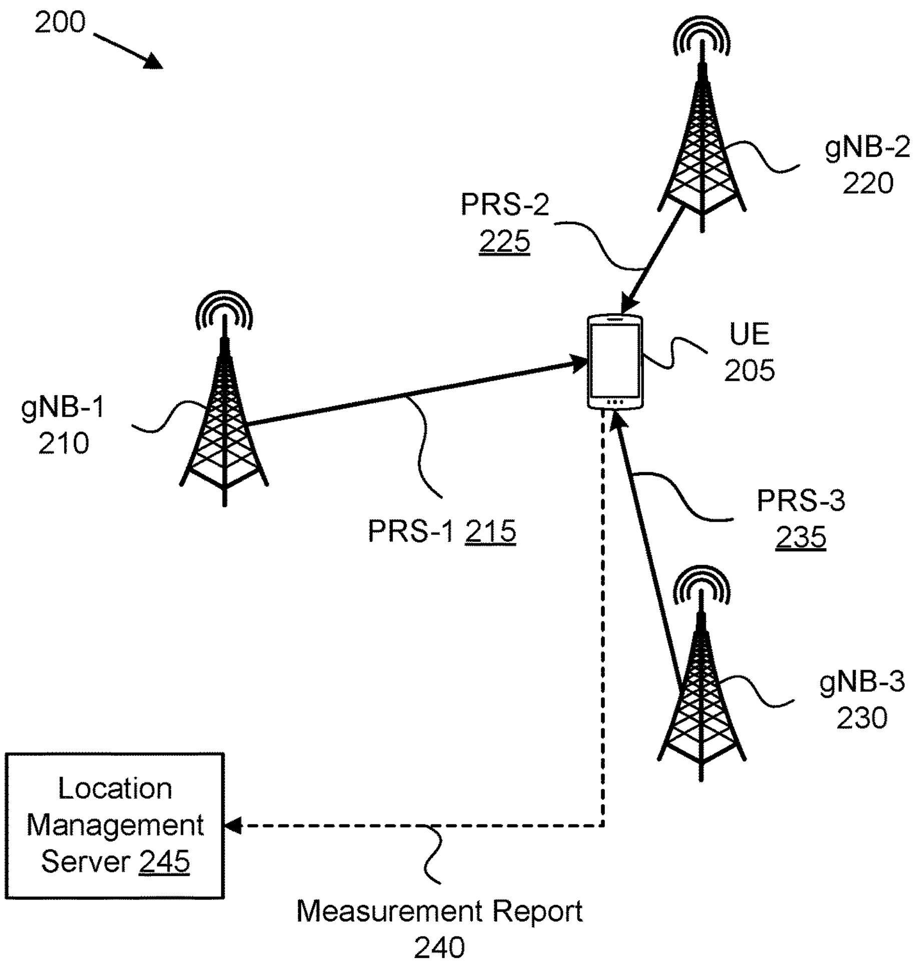
FIG. 2A is a diagram illustrating one embodiment of an alternative procedure for receiving PRS and generating a positioning measurement report.

FIG. 2A depicts a scenario 200 of PRS beam grouping. The scenario 200 involves a UE 205 (i.e., one embodiment of the remote unit 105) that receives Downlink ("DL") Positioning Reference Signals ("PRS") from multiple Transmit/Receive Points ("TRPs"). Here, the TRPs include a first gNB 210 sending first DL PRS 215, a second gNB 220 sending second DL PRS 225, and a third gNB 230 sending third DL PRS 235. The UE 205 performs positioning measurements using the various PRS.

Here, the UE 205 may perform one or more of the following measurements to facilitate support of the positioning techniques in Table 1, below:

| UE Measurements | Positioning Techniques |
|---|---|
| DL PRS RSTD | DL-TDOA |
| DL PRS RSRP | DL-TDOA, DL-AoD, Multi-RTT |
| UE Rx-Tx time difference | Multi-RTT |

Regarding the positioning techniques, in downlink time difference of arrival ("DL-TDOA") the UE to perform downlink reference signal time difference ("DL RSTD") measurements for each gNB's PRSs. These measurements are reported to the location measurement server 240 which uses the TDOAs to estimate the UE position.

For Downlink angle-of-departure ("DL-AoD"), the UE 205 measures the Downlink PRS Reference Signal Receive Power ("DL PRS RSRP") per beam/gNB. Measurement reports are used to determine the AoD based on UE beam location for each gNB. The location management server 240 uses the Angles-of-Departure ("AoDs") to estimate the UE position.

For Multi-cell round trip time ("Multi-RTT"), the gNBs 210, 220, 230 and UE 205 perform Rx-Tx time difference measurement for the signal of each cell. The measurement reports from the UE and gNBs are sent to the location server to determine the round trip time ("RTT") of each cell and derive the UE position. RTT-based positioning removes the requirement of tight network timing synchronization across nodes (as needed in legacy techniques such as TDOA) and offers additional flexibility in network deployment and maintenance.

As described herein, the UE 205 may combine measurement reports into a single report to send to the location management server 240.

Figure 2B:
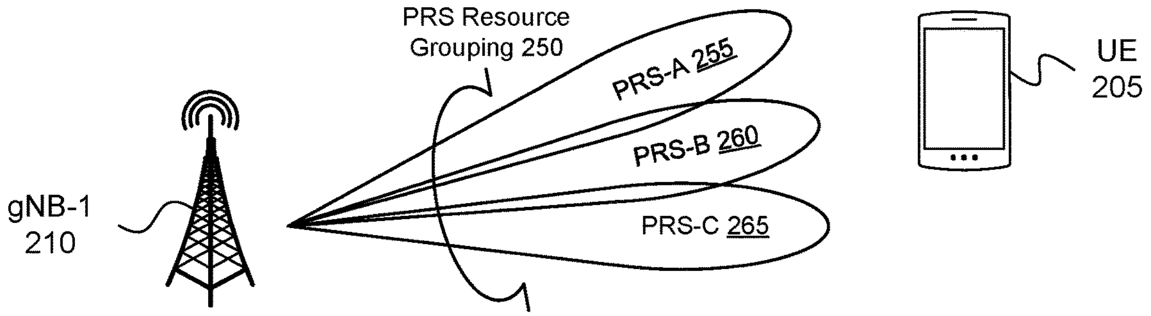
FIG. 2B is a diagram illustrating one embodiment of an alternative procedure for receiving PRS and generating a positioning measurement report.

FIG. 2B depicts a scenario of PRS beam grouping 250. The gNB 210 sends PRS on multiple Tx beams. Depicted here are PRS-A 255 sent on a first Tx beam, PRS-B 260 sent on a second Tx beam, and PRS-C 265 sent on a third Tx beam. The UE 205 may receive multiple Tx beams. As noted above, the PRS may be used to perform positioning measurements.

In various embodiments, the PRS resources are grouped, as described in further detail below. Here, all the PRS transmissions with multiple Tx beams on multiple PRS resources within a group can be expected by the UE 205 to be received on the same Rx beam. In certain embodiments, if the UE 205 is configured and/or indicated with grouping of PRS resources at Tx side, then the UE 205 is expected to receive PRS transmission on not all the PRS beams associated with corresponding PRS resources within a same PRS group.

In certain embodiments, if the UE 205 is configured and/or indicated with grouping of PRS resources at Rx side, then the UE 205 is expected to send only up to single report with positioning measurements corresponding to positioning technique for a PRS group. Alternatively, the UE 205 may be expected to use one or more PRS resources belonging to the same group for generating a combined positioning measurement report instead of possible having multiple reports associated with multiple PRS resources within the same group.

A first solution relates to grouping of PRS resources. According to the first solution, a grouping ID is to be associated with every PRS resource ID within a PRS resource set. When the UE 205 is configured with the same grouping ID for different PRS resource ID, then the UE 205 is expected to receive the corresponding PRS transmissions (on respective Tx beams) using the same spatial filter at the receiver, i.e., using the same Rx beam.

Figure 3:
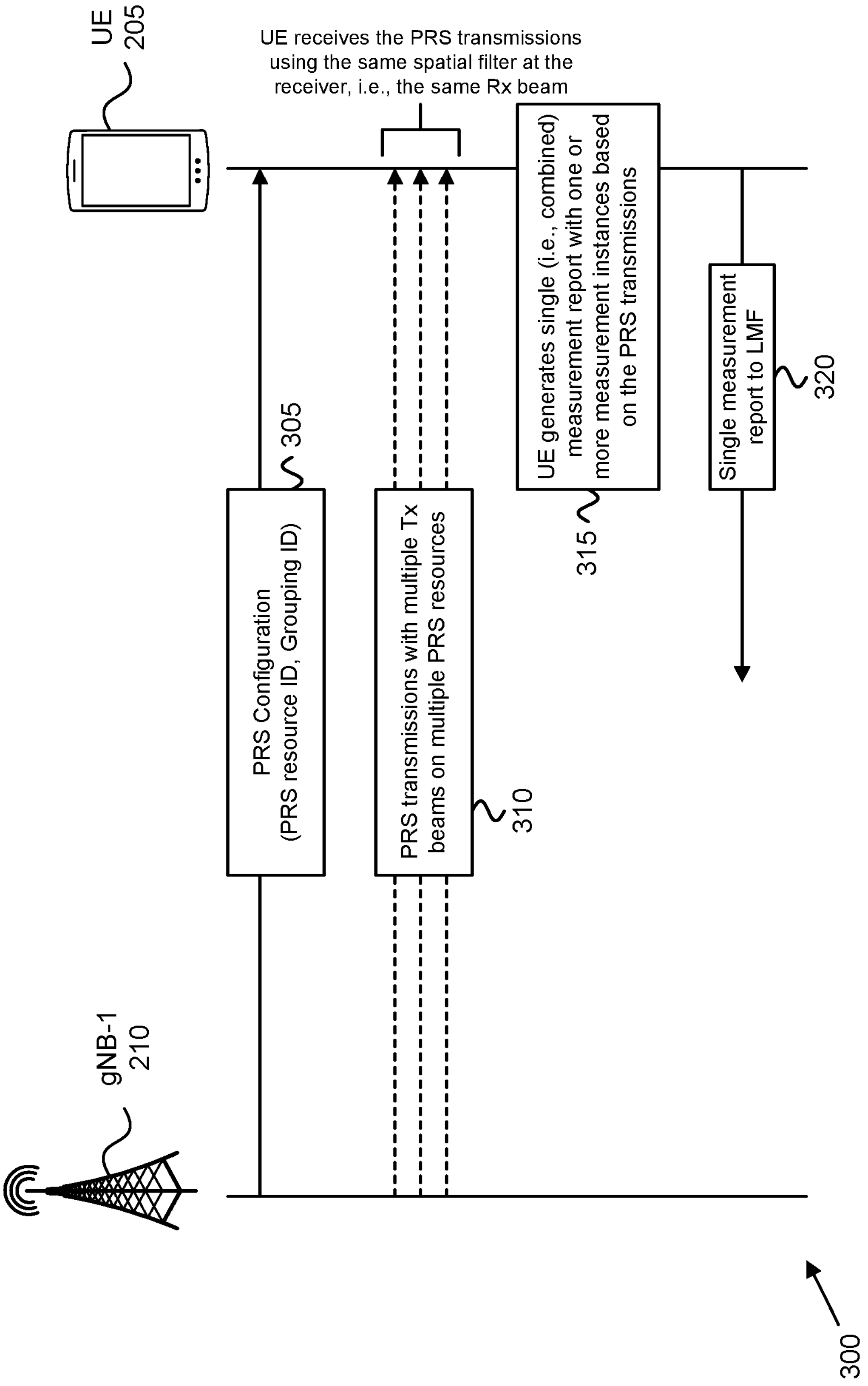
FIG. 3 is a diagram illustrating one embodiment of a procedure for reporting PRS measurements.

FIG. 3 depicts a procedure 300 for generating a measurement report based on PRS transmissions, according to embodiments of the disclosure. The procedure 300 involves the UE 205 and a gNB, here the gNB-1 210. The gNB-1 210 sends a PRS configuration to the UE 205 (see messaging 305). The gNB-1 210 sends PRS transmissions using multiple TX beams on multiple PRS resources (see messaging 310). Here, the UE 205 receives the PRS transmissions using the same spatial filter at the receiver, i.e., the same Rx beam.

In one implementation of the first solution, the grouping IDs are indexed locally within a PRS resource set. As an example, if a same grouping ID is associated to two PRS resource IDs belonging to two different PRS resource set IDs, then the UE 205 is not expected to receive the corresponding PRS transmissions (on respective Tx beams) using the same spatial filter at the receiver.

In an alternate implementation of the first solution, implicit grouping may be assumed at the UE 205 when the Quasi-Co-Location ("QCL") type-D assumption configured for a PRS resource ID has the same source reference signal ID, i.e., same Rx beam (similar to receiving source reference signals ID) may be used to receive PRS transmissions on respective Tx beams.

In another implementation of the first solution, implicit grouping may be assumed at the UE 205 based on some other factors.

In another implementation of the first solution, CSI-RS may be configured as source RS for indicating at least QCL type-D assumption for PRS resources and if group-based beam reporting for CSI-RS is enabled, then grouping of PRS resources may also be assumed at the UE 205. The grouping is based on how the PRS resource ID is QCL'ed (Quasi-Co-Located) with type-D assumption to CSI-RS resource ID.

In one example, if PRS resource ID 1, PRS resource ID 4, PRS resource ID 5 are QCL'ed with type-D assumption to CSI-RS resource ID 4, CSI-RS resource ID 5, CSI-RS resource ID 6, respectively and CSI-RS resource ID 4-6 are grouped, then the corresponding PRS resource IDs also may be assumed to be grouped, i.e., PRS resource ID 1, 4, 5 are assumed to be within same group and the UE 205 may expect to use the same RX beam to receive the PRS transmissions on these resources (Tx beams).

In one example implementation, TCI indication framework in NR in downlink may be enhanced to indicate PRS resource ID as a target and/or source RS in the TCI state to allow dynamic QCL association for PRS for any type of QCL assumptions. If a PRS resource ID is already configured with a QCL assumption by higher layers and if, additionally, a DCI dynamically indicates a TCI state with QCL assumption for that PRS resource ID, then the QCL assumption is overwritten and the UE 205 is expected to use the QCL assumptions that are dynamically indicated by DCI.

A second solution relates to selective transmission/repetition on PRS resources within a group. According to the second solution, when PRS resource grouping is configured and selective transmission/repetition of PRS on PRS resources within a group is enabled, then the UE 205 is not expected to receive PRS transmission on all the configured PRS resource IDs and corresponding repetitions. When the UE 205 is not expected to receive PRS transmission on certain configured resources, then the UE 205 may expect to use those corresponding symbols for other data/control reception or transmission. In one example implementation, the UE 205 may be either configured by RRC or dynamically indicated via DCI by the network to receive selective transmissions/repetitions on PRS resources within the same group. In alternate example implementation, the UE 205 may be indicated by LMF to enable selective transmissions/repetitions. This could either explicitly indicated or may be implied based on the accuracy requirements for positioning measurements.

For selective transmission/repetition of PRS on PRS resources within a group, in one example implementation of the second solution, a pre-configured pattern is known to the UE 205, for example, only the PRS with the lowest resource ID within the group is actually transmitted and the UE 205 is not expected to receive any other PRS transmission (on other PRS resources within the same group) in a single PRS burst/occasion. In an alternate implementation of the second solution, the UE 205 may be configured with multiple transmission/repetition patterns and is dynamically indicated with one of the configured patterns by DCI.

In other implementations of the second solution, when repetition of PRS within the PRS burst/occasion is configured and if the UE 205 is configured/indicated with PRS resource grouping and selective transmission/repetition, then the UE 205 may expect to receive PRS repetitions on different PRS resource (i.e., with different Tx beam), but the PRS resource IDs should be associated with the same PRS group ID. In this case, the UE 205 may receive PRS on multiple Tx beams (instead of repetition on same Tx beam), but receive using the same Rx beam, because QCL-typeD is assumed for all the PRS resources within the same group.

According to the second solution, different patterns and combinations of transmitting and/or repetitions of PRS on same or different PRS resource ID but belonging to the same PRS group ID may be configured/indicated to the UE 205. In an alternate implementation of this embodiment, different patterns and combinations of transmitting and/or repetition of PRS may be configured/indicated to the UE 205 even if there is not grouping configured for PRS resource ID. This will allow for muting PRS transmission on certain beams that are not necessarily required depending up on the location of the transmission point and the UE 205. Note that the grouping mentioning in the second solution is based on the proposed methods in the first solution.

Figure 4:
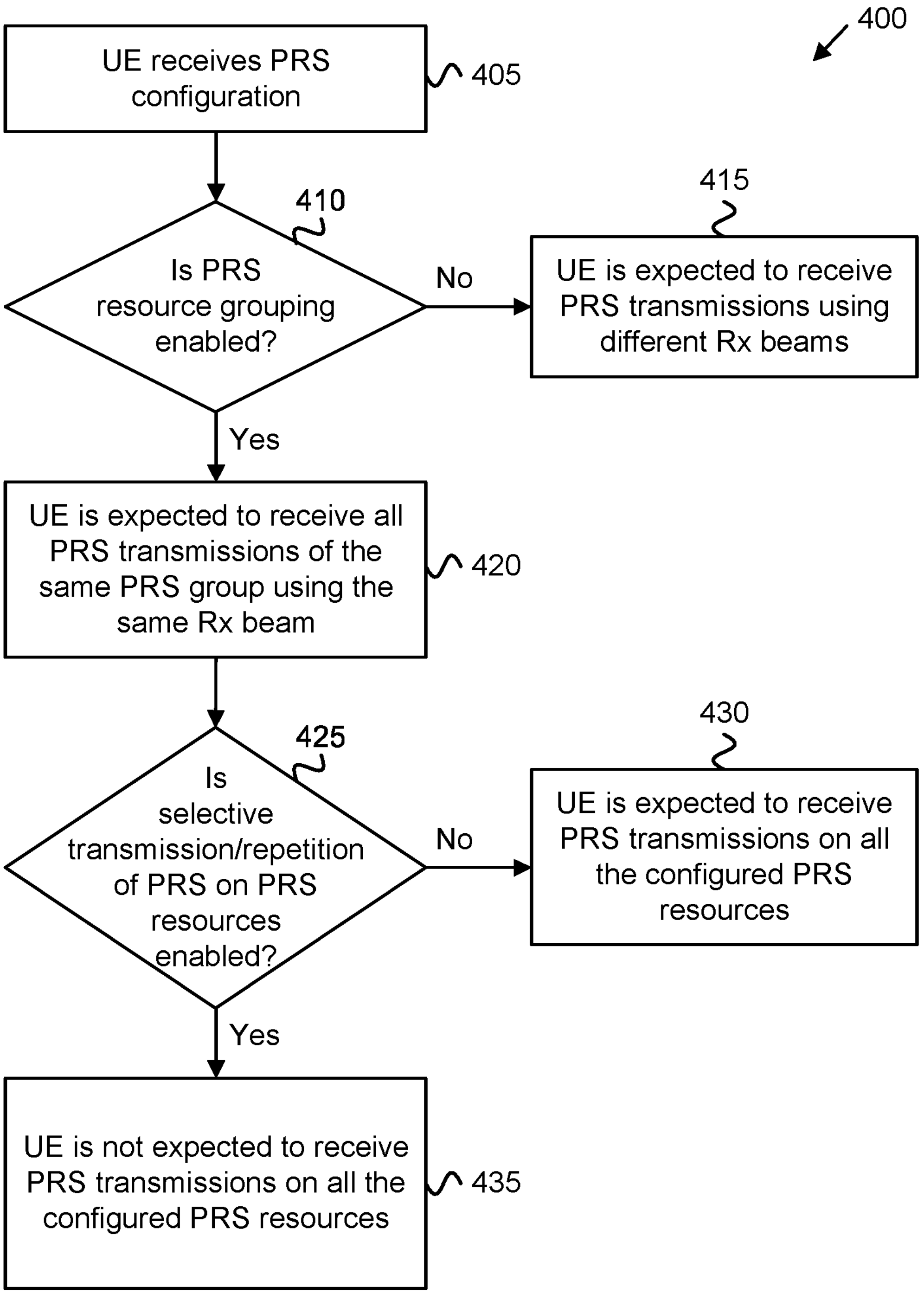
FIG. 4 is a diagram illustrating one embodiment of a procedure for handling PRS resource grouping.

FIG. 4 is a flowchart diagram depicting a procedure 400 performed by a UE (i.e., the UE 205), according to embodiments of the first and second solutions. At step 405, the UE receives a PRS configuration (e.g., from the gNB-1 210 or other serving gNB). At step 410, the UE determines whether PRS resource grouping is enabled. If PRS resource grouping is not enabled, then the UE is expected to receive PRS transmissions using different Rx beams (see Step 415). Otherwise, if PRS resource grouping is enabled, then the UE is expected to receive all PRS transmissions of the same PRS group using the same Rx beam (see Step 420).

At step 425, the UE determines whether selective transmission/repetition of PRS on PRS resources is enabled. If selective transmission/repetition of PRS on PRS resources is not enabled, then the UE is expected to receive PRS transmissions on all the configured PRS resources (see Step 430). Otherwise, if selective transmission/repetition of PRS on PRS resources is enabled, then the UE is not expected to receive PRS transmissions on all the configured PRS resources (see Step 435).

Returning to FIG. 3, the UE 205 generates a single (i.e., combined) measurement report with one or more measurement instances based on the PRS transmissions (see block 315) and transmits the single measurement report to a Location Management Function ("LMF").

A third solution relates to single/combined reporting of positioning measurements for PRS resources within a group. According to the third solution, when PRS grouping is configured/indicated and the UE 205 is also configured/indicated with group reporting for positioning measurements based on PRS transmissions/repetitions, then the UE 205 is expected to report single/combined report corresponding to all the configured PRS resources within a single group. Positioning measurements for a PRS group may be PRS RSRP measurements, PRS RSTD measurements, Rx-Tx time difference.

In one implementation of the third solution, measurements such as RSRP may be based on the average of RSRP measured on transmission PRS within the same group. Other example implementations for measurements including methods such as differential reporting and highest measurements. The exact method to be used may be either statically configured or indicated to the UE 205 by RRC and/or DCI.

Note that the grouping mentioned in the third solution is based on the proposed methods in the first solution. Furthermore, the third solution may be used in combination with the second solution, such that there is overhead reduction both for PRS transmission and reporting of positioning measurements based on selective PRS transmission/reception.

Figure 5:
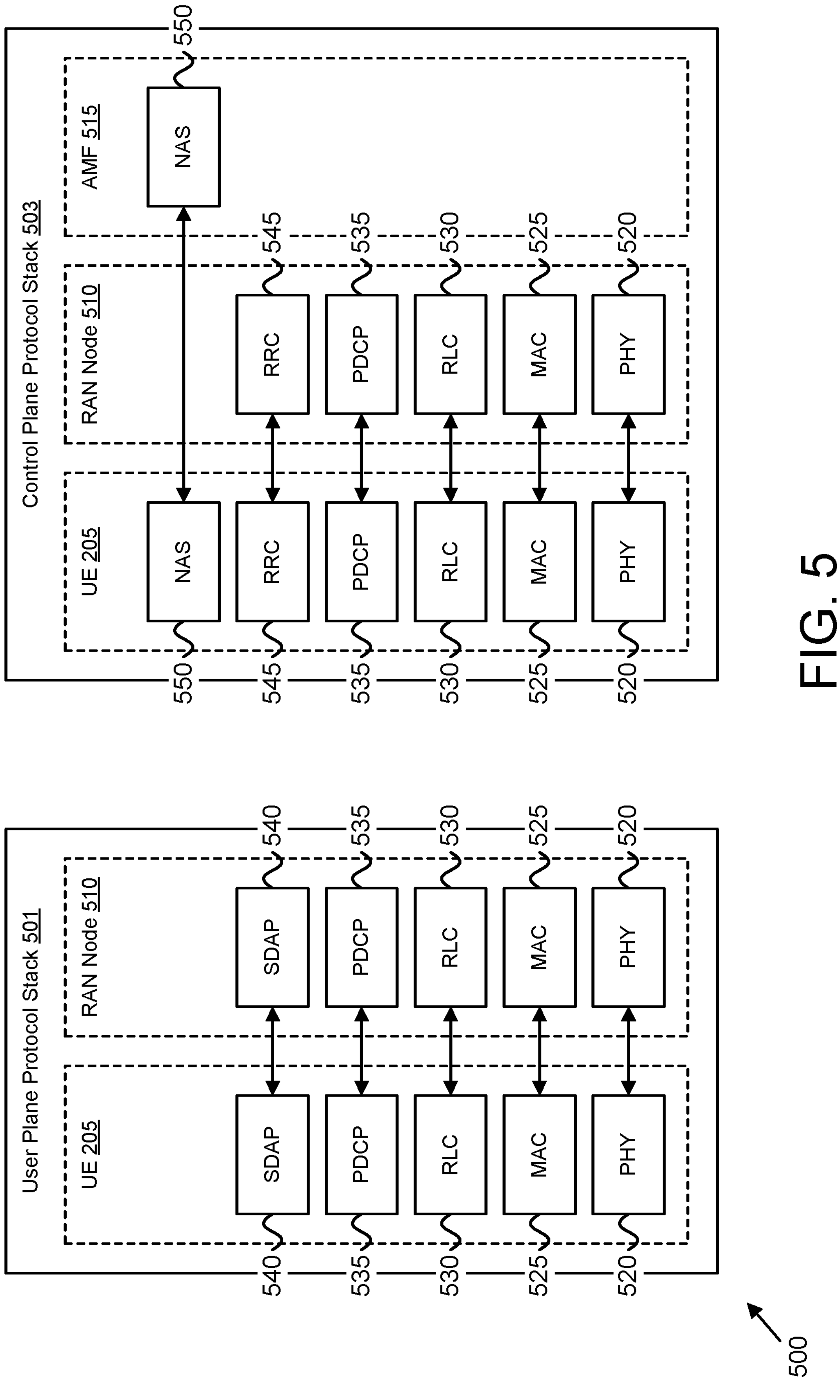
FIG. 5 is a block diagram illustrating one embodiment of a 5G New Radio ("NR") protocol stack.

FIG. 5 depicts a NR protocol stack 500, according to embodiments of the disclosure. While FIG. 5 shows the UE 205, the RAN node 510 and an AMF 515 in a 5G core network ("5GC"), these are representative of a set of remote units 105 interacting with a base unit 121 and a mobile core network 140. As depicted, the protocol stack 500 comprises a User Plane protocol stack 501 and a Control Plane protocol stack 503. The User Plane protocol stack 501 includes a physical ("PHY") layer 520, a Medium Access Control ("MAC") sublayer 525, the Radio Link Control ("RLC") sublayer 530, a Packet Data Convergence Protocol ("PDCP") sublayer 535, and Service Data Adaptation Protocol ("SDAP") layer 540. The Control Plane protocol stack 503 includes a physical layer 520, a MAC sublayer 525, a RLC sublayer 530, and a PDCP sublayer 535. The Control Plane protocol stack 503 also includes a Radio Resource Control ("RRC") layer 545 and a Non-Access Stratum ("NAS") layer 550.

The AS layer (also referred to as "AS protocol stack") for the User Plane protocol stack 501 consists of at least SDAP, PDCP, RLC and MAC sublayers, and the physical layer. The AS layer for the Control Plane protocol stack 503 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 545 and the NAS layer 550 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 520 offers transport channels to the MAC sublayer 525. The physical layer 520 may perform CCA/LBT procedure using energy detection thresholds, as described herein. In certain embodiments, the physical layer 520 may send a notification of UL LBT failure to a MAC entity at the MAC sublayer 525. The MAC sublayer 525 offers logical channels to the RLC sublayer 530. The RLC sublayer 530 offers RLC channels to the PDCP sublayer 535. The PDCP sublayer 535 offers radio bearers to the SDAP sublayer 540 and/or RRC layer 545. The SDAP sublayer 540 offers QoS flows to the core network (e.g., 5GC). The RRC layer 545 provides for the addition, modification, and release of Carrier Aggregation and/or Dual Connectivity. The RRC layer 545 also manages the establishment, configuration, maintenance, and release of Signaling Radio Bearers ("SRBs") and Data Radio Bearers ("DRBs").

The NAS layer 550 is between the UE 205 and the 5GC 515. NAS messages are passed transparently through the RAN. The NAS layer 550 is used to manage the establishment of communication sessions and for maintaining continuous communications with the UE 205 as it moves between different cells of the RAN. In contrast, the AS layer is between the UE 205 and the RAN (i.e., RAN node 510) and carries information over the wireless portion of the network.

Figure 6:
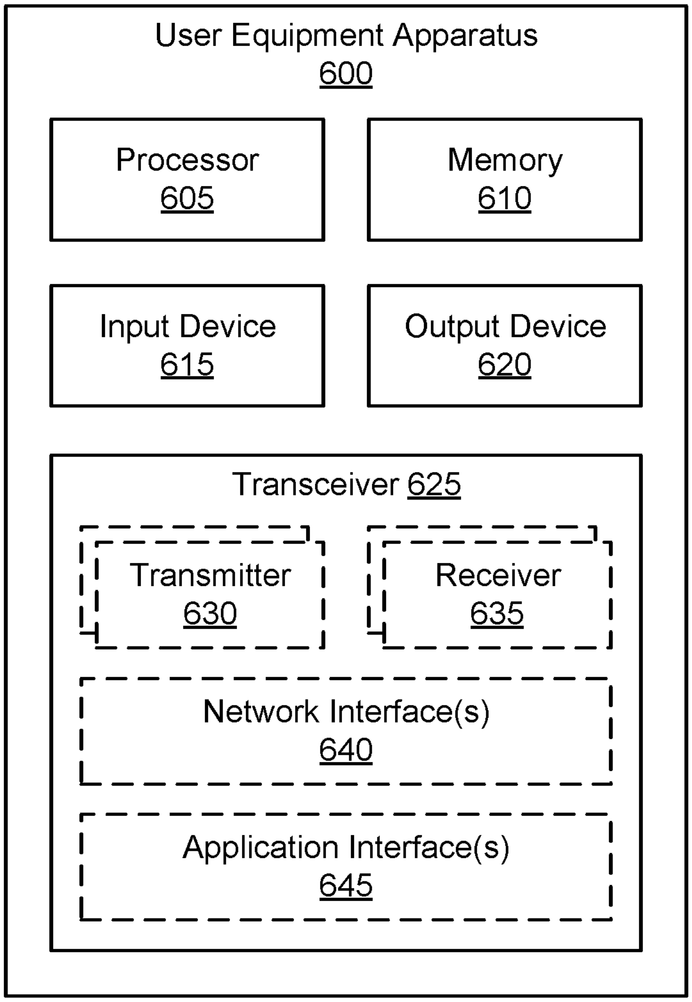
FIG. 6 is a diagram illustrating one embodiment of a user equipment apparatus that may be used for receiving PRS and generating a positioning measurement report.

FIG. 6 depicts a user equipment apparatus 600 that may be used for receiving PRS and generating a positioning measurement report, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. In some embodiments, the transceiver 625 communicates with one or more cells (or wireless coverage areas) supported by one or more base units 121. In various embodiments, the transceiver 625 is operable on unlicensed spectrum. Moreover, the transceiver 625 may include multiple UE panels supporting one or more beams. Additionally, the transceiver 625 may support at least one network interface 640 and/or application interface 645. The application interface(s) 645 may support one or more APIs. The network interface(s) 640 may support 3GPP reference points, such as Uu, N1, PCS, etc. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. In certain embodiments, the processor 605 may include an application processor (also known as "main processor") which manages application-domain and operating system ("OS") functions and a baseband processor (also known as "baseband radio processor") which manages radio functions.

In various embodiments, the processor 605 controls the user equipment apparatus 600 to implement the above described UE behaviors. For example, the transceiver 625 may receive a plurality of PRS from at least one base unit (i.e., TRP, gNB, or eNB), each PRS being transmitted using a specific transmit beam. The processor 605 generates a single positioning measurement report that combines measurement instances for the received plurality of PRS. Via the transceiver 625, the processor 605 transmits the single positioning measurement report to a LMF for UE-assisted positioning.

In some embodiments, the processor 605 receives a higher-layer configuration (e.g., configured by RRC) to report the single positioning measurement report for a group of PRS resources, where the measurement report is based on one or more PRS transmissions associated with PRS resources within the group. In some embodiments, the processor receives a dynamic indication (e.g., in DCI) to report the single positioning measurement report for a group of PRS resources, where the measurement report is based on one or more PRS transmissions associated with PRS resources within the group.

In some embodiments, the PRS resources in the PRS resource set correspond to the same base unit, where each PRS resource ID corresponds to a single transmit beam of the base unit. In some embodiments, the processor receives an indication for a measurement technique, where the measurement instances contain a PRS RSRP measurement, a PRS RSTD measurement, and/or a Receive/Transmit Time Difference measurement.

In some embodiments, the processor receives a configuration for grouping multiple PRS resource IDs within a PRS resource set, where the same spatial filter applied at a receiver is used to receive a PRS transmission on PRS resources within the group of PRS resources. In certain embodiments, the spatial filter applied at the receiver is based on a QCL with type D assumption indicated to the UE. In such embodiments, the QCL type-D assumption is either configured by higher layers or dynamically indicated via DCI using a TCI state indication.

In some embodiments, the QCL t e-D assumption for PRS resources is indicated by configuring a source RS, where the source RS is one of: a CSI-RS, an SSB, an SRS and a PRS. In certain embodiments, the source RS is a CSI-RS with group-based beam reporting enabled, where the QCL type-D assumption for PRS resources is assumed based on how a PRS resource ID is quasi-co-located with a CSI-RS resource ID.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to receiving PRS and generating a positioning measurement report. For example, the memory 610 may store various parameters, panel/beam configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
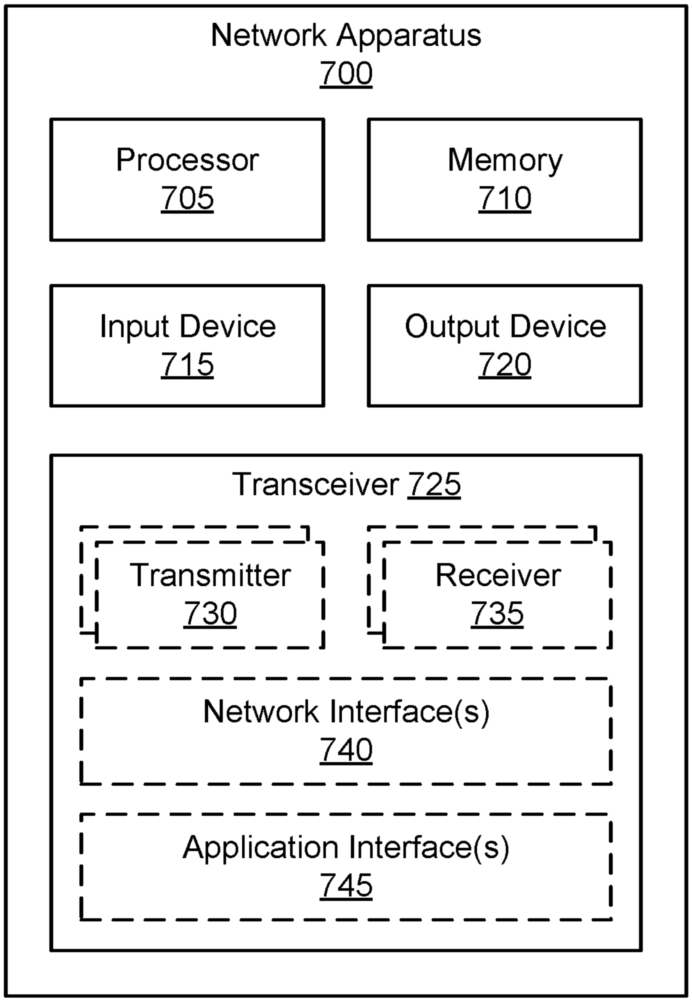
FIG. 7 is a diagram illustrating one embodiment of a network apparatus that may be used for receiving PRS and generating a positioning measurement report.

FIG. 7 depicts a network apparatus 700 that may be used for receiving PRS and generating a positioning measurement report, according to embodiments of the disclosure. In one embodiment, network apparatus 700 may be one implementation of a RAN node, such as the base unit 71, the RAN node 27, or a gNB, as described above. Furthermore, the base network apparatus 700 may include a processor 705, a memory 710, an input device 715, an output device 720, and a transceiver 725.

In some embodiments, the input device 715 and the output device 720 are combined into a single device, such as a touchscreen. In certain embodiments, the network apparatus 700 may not include any input device 715 and/or output device 720. In various embodiments, the network apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 75. Additionally, the transceiver 725 may support at least one network interface 740 and/or application interface 745. The application interface(s) 745 may support one or more APIs. The network interface(s) 740 may support 3GPP reference points, such as Uu, N1, N2 and N3. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network apparatus 700 is a RAN node (e.g., gNB) that communicates with one or more UEs, as described herein. In such embodiments, the processor 705 controls the network apparatus 700 to perform the above described RAN behaviors. When operating as a RAN node, the processor 705 may include an application processor (also known as "main processor") which manages application-domain and operating system ("OS") functions and a baseband processor (also known as "baseband radio processor") which manages radio functions.

In various embodiments, the processor 705 controls the network apparatus 700 to implement the above described gNB/RAN behaviors. For example, via the transceiver 725 the processor 705 may transmit a plurality of PRS, where each PRS is transmitted using a specific transmit beam/panel. In various embodiments, the processor 705 may configure a UE for grouping multiple PRS resource IDs within a PRS resource set, where the same spatial filter applied at a UE receiver is used to receive a PRS transmission on PRS resources within the group of PRS resources.

In certain embodiments, the processor 705 may configure a UE to report a single positioning measurement report for a group of PRS resources, the measurement report being based on one or more PRS transmissions associated with PRS resources within the group. Alternatively, the processor 705 may control the transceiver 725 to send a dynamic indication (e.g., in DCI) to the UE that instructs the UE to report a single positioning measurement report for a group of PRS resources, the measurement report being based on one or more PRS transmissions associated with PRS resources within the group. In certain embodiments, the processor 705 further controls the transceiver to send an indication for a measurement technique. Here, the measurement instances may be a PRS RSRP measurement, a PRS RSTD measurement, and/or a Rx/Tx Time Difference measurement.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to receiving PRS and generating a positioning measurement report. For example, the memory 710 may store parameters, configurations, resource assignments, policies, and the like, as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network apparatus 700, such as a smart watch, smart glasses, a heads-up display, or the like. Further, the output device 720 may be a component of a smart phone, a personal digital assistant, a television, a table computer, a is notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network apparatus 700 may have any suitable number of transmitters 730 and receivers 735. Further, the transmitter(s) 730 and the receiver(s) 735 may be any suitable type of transmitters and receivers.

The transceiver 725 is operable on unlicensed spectrum, wherein the transceiver 725 includes a plurality of gNB panels. As used herein, a "gNB panel" refers to a logical entity that may be mapped to physical gNB antennas. Depending on the implementation, a "gNB panel" can have an operational role of Unit of antenna group to control its Tx beam independently.

Figure 8:
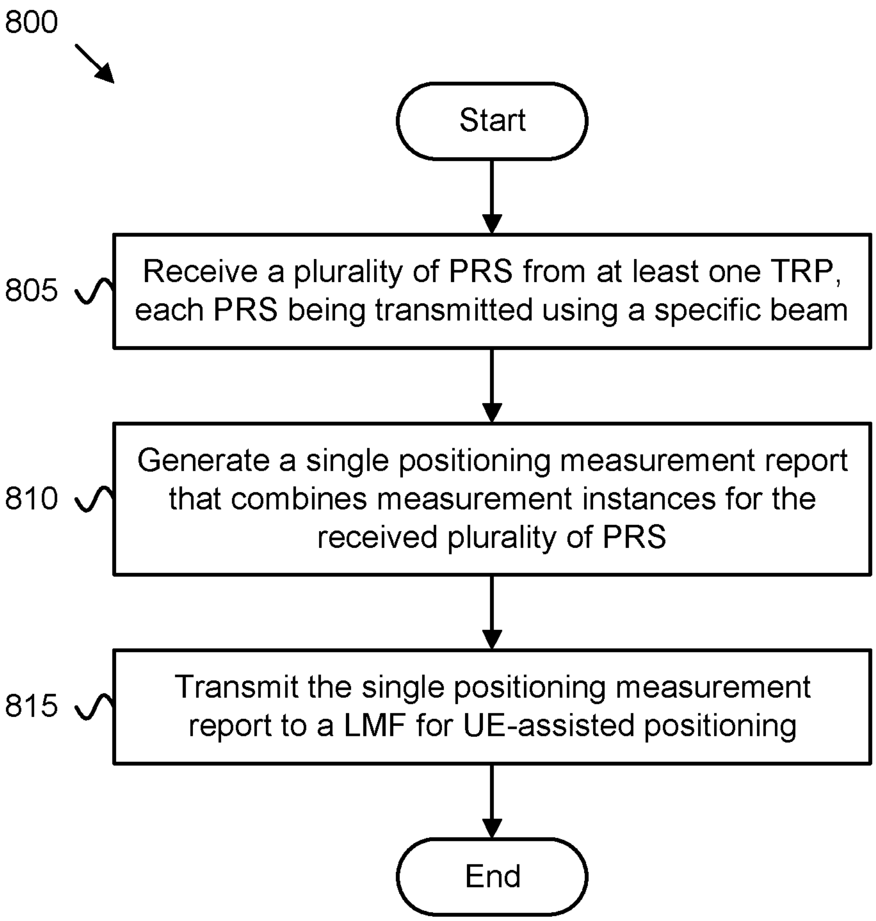
FIG. 8 is a flowchart diagram illustrating one embodiment of a first method for receiving PRS and generating a positioning measurement report.

FIG. 8 depicts one embodiment of a method 800 for receiving PRS and generating a positioning measurement report, according to embodiments of the disclosure. In various embodiments, the method 800 is performed by a user equipment device in a mobile communication network, such as the remote unit 85, the UE 205, and/or the user equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a plurality of Positioning Reference Signals ("PRS") from at least one Transmit-Receive Point ("TRP"), each PRS being transmitted using a specific beam. The method 800 includes generating 810 a single positioning measurement report that combines measurement instances for the received plurality of PRS. The method 800 includes transmitting 815 the single positioning measurement report to a location management function ("LMF") for UE-assisted positioning. The method 800 ends.

Disclosed herein is a first apparatus for receiving PRS and generating a positioning measurement report, according to embodiments of the disclosure. The first apparatus may be implemented by a user equipment device in a mobile communication network, such as the remote unit 105, the UE 205, and/or the user equipment apparatus 800, described above. The first apparatus includes a processor and a transceiver that receives a plurality of Positioning Reference Signals ("PRS") from at least one base unit, each PRS being transmitted using a specific transmit beam. The processor generates a single positioning measurement report that combines measurement instances for the received plurality of PRS. Via the transceiver, the processor transmits the single positioning measurement report to a location management function ("LMF") for UE-assisted positioning.

In some embodiments, the processor receives a higher-layer configuration (e.g., configured by RRC) to report the single positioning measurement report for a group of PRS resources, where the measurement report is based on one or more PRS transmissions associated with PRS resources within the group. In some embodiments, the processor receives a dynamic indication (e.g., in DCI) to report the single positioning measurement report for a group of PRS resources, where the measurement report is based on one or more PRS transmissions associated with PRS resources within the group.

In some embodiments, the PRS resources in the PRS resource set correspond to the same base unit, where each PRS resource ID corresponds to a single transmit beam of the base unit. In some embodiments, the processor receives an indication for a measurement technique, where the measurement instances contain one or more of: a PRS Reference Signal Received Power ("RSRP") measurement, a PRS Reference Signal Time Difference ("RSTD") measurement, and a Receive/Transmit Time Difference measurement.

In some embodiments, the processor receives a configuration for grouping multiple PRS resource identifiers ("IDs") within a PRS resource set, where the same spatial filter applied at a receiver is used to receive a PRS transmission on PRS resources within the group of PRS resources. In certain embodiments, the spatial filter applied at the receiver is based on a Quasi-Co-Location ("QCL") with type D assumption indicated to the UE. In such embodiments, the QCL type-D assumption is either configured by higher layers or dynamically indicated via DCI using a TCI state indication.

In some embodiments, the QCL t e-D assumption for PRS resources is indicated by configuring a source reference signal ("RS"), where the source RS is one of: a Channel State Information RS ("CSI-RS"), a Synchronization Signal Block ("SSB"), a Sounding Reference Signal ("SRS") and a PRS. In certain embodiments, the source RS is a CSI-RS with group-based beam reporting enabled, where the QCL type-D assumption for PRS resources is assumed based on how a PRS resource ID is quasi-co-located with a CSI-RS resource ID.

Disclosed herein is a first method for receiving PRS and generating a positioning measurement report, according to embodiments of the disclosure. The first method may be performed by a user equipment device in a mobile communication network, such as the remote unit 105, the UE 205, and/or the user equipment apparatus 800. The first method includes receiving a plurality of Positioning Reference Signals ("PRS") from at least one base unit, each PRS being transmitted using a specific beam, and generating a single positioning measurement report that combines measurement instances for the received plurality of PRS. The first method further includes transmitting the single positioning measurement report to a location management function ("LMF") for UE-assisted positioning.

In some embodiments, the first method includes receiving a higher-layer configuration (e.g., configured by RRC) to report the single positioning measurement report for a group of PRS resources, where the measurement report is based on one or more PRS transmissions associated with PRS resources within the group. In some embodiments, the first method includes receiving a dynamic indication (e.g., in DCI) to report the single positioning measurement report for a group of PRS resources, where the measurement report is based on one or more PRS transmissions associated with PRS resources within the group.

In some embodiments, the first method includes receiving an indication for a measurement technique, where the measurement instances contain one or more of: a PRS Reference Signal Received Power ("RSRP") measurement, a PRS Reference Signal Time Difference ("RSTD") measurement, and a Receive/Transmit Time Difference measurement. In some embodiments, the PRS resources in the PRS resource set correspond to the same base unit, and where each PRS resource ID corresponds to a single transmit beam of the base unit.

In some embodiments, the first method includes receiving a configuration for grouping multiple PRS resource identifiers ("IDs") within a PRS resource set, where the same spatial filter applied at a receiver is used to receive a PRS transmission on PRS resources within the group of PRS resources. In certain embodiments, the spatial filter applied at the receiver is based on a Quasi-Co-Location ("QCL") with type D assumption indicated to the UE. In such embodiments, the QCL type-D assumption is either configured by higher layers or dynamically indicated via DCI using a TCI state indication.

In some embodiments, the QCL t e-D assumption for PRS resources is indicated by configuring a source reference signal ("RS"), where the source RS is one of: a Channel State Information RS ("CSI-RS"), a Synchronization Signal Block ("SSB"), a Sounding Reference Signal ("SRS") and a PRS. In certain embodiments, the source RS is a CSI-RS with group-based beam reporting enabled, where the QCL type-D assumption for PRS resources is assumed based on how a PRS resource ID is quasi-co-located with a CSI-RS resource ID.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:

receiving three or more positioning reference signals ("PRS") from at least one base station using multiple beams;

receiving a first indication to perform a downlink angle-of-departure ("DL-AoD") measurement for the multiple beams;

receiving a first configuration to combine DL-AOD measurement instances for the multiple beams into a first single positioning measurement report;

receiving a second indication of a single timing-based measurement technique associated with one or more of: PRS reference signal time difference ("RSTD") measurement, or a receive/transmit time difference measurement;

receiving a second configuration to combine measurement instances associated with the single timing-based measurement technique for the received three or more PRS into a second single positioning measurement report;

generating, based on the first indication and on the first configuration, the first single positioning measurement report;

generating, based on the second indication and on the second configuration, the second single positioning measurement report; and transmitting the first single positioning measurement report and the second single positioning measurement report to a location management function ("LMF") for UE-assisted positioning.

2. The method of claim 1, further comprising:

receiving a dynamic indication to report the second single positioning measurement report for a group of PRS resources, wherein the second single positioning measurement report is based on one or more PRS transmissions associated with PRS resources within the group.

3. The method of claim 2, further comprising receiving a configuration for grouping multiple PRS resource identifiers ("IDs") within a PRS resource set, wherein a same spatial filter applied at a receiver is used to receive a PRS transmission on PRS resources within the group of PRS resources.

4. The method of claim 3, wherein the same spatial filter applied at the receiver is based on a quasi-co-location ("QCL") type-D assumption indicated to the UE.

5. The method of claim 4, wherein the QCL type-D assumption is either configured by higher layers or dynamically indicated via downlink control information ("DCI") using a transmission configuration indicator ("TCI") state indication.

6. The method of claim 4, wherein the QCL type-D assumption for PRS resources is indicated by configuring a source reference signal ("RS"), wherein the source RS is one of: a channel state information RS ("CSI-RS"), a synchronization signal block ("SSB"), a sounding reference signal ("SRS"), or a PRS.

7. The method of claim 6, wherein the source RS is a CSI-RS with group-based beam reporting enabled, wherein the QCL type-D assumption for PRS resources is assumed based on how a PRS resource identifier ("ID") is quasi-co-located with a CSI-RS resource ID.

8. The method of claim 3, wherein the PRS resources in the PRS resource set correspond to a same base station, and wherein each PRS resource identifier ("ID") corresponds to a single transmit beam of the same base station.

9. The method of claim 1, further comprising receiving an indication in downlink control information ("DCI"), wherein generating the first single positioning measurement report or the second single positioning measurement report is based on receiving the indication in the DCI.

10. A user equipment ("UE") for wireless communication, comprising:

at least one memory; and at least one processor coupled with the at least one memory and configured to cause the UE to:

receive three or more positioning reference signals ("PRS") from at least one base station using multiple beams;

receive a first indication to perform a downlink angle-of-departure ("DL-AoD") measurement for the multiple beams;

receive a first configuration to combine measurement instances for the multiple beams into a first single positioning measurement report;

receive a second indication of a single timing-based measurement technique associated with one or more of: PRS reference signal time difference "RSTD") measurement, or a receive/transmit time difference measurement;

receive a second configuration to combine measurement instances associated with the single timing-based measurement technique for the received three or more PRS into a second single positioning measurement report;

generate, based on the first indication and on the first configuration, the first single positioning measurement report;

generating, based on the second indication and on the second configuration, the second single positioning measurement report; and transmit the first single positioning measurement report and the second single positioning measurement report to a location management function ("LMF") for UE-assisted positioning.

11. The UE of claim 10, wherein the at least one processor is configured to cause the UE to:

receive a dynamic indication to report the second single positioning measurement report for a group of PRS resources, wherein the second single positioning measurement report is based on one or more PRS transmissions associated with PRS resources within the group.

12. The UE of claim 11, wherein the at least one processor is configured to cause the UE to receive a configuration for grouping multiple PRS resource identifiers ("IDs") within a PRS resource set, wherein a same spatial filter applied at a receiver is used to receive a PRS transmission on PRS resources within the group of PRS resources.

13. The UE of claim 12, wherein the same spatial filter applied at the receiver is based on a quasi-co-location ("QCL") type-D assumption indicated to the UE.

14. The UE of claim 13, wherein the QCL type-D assumption is either configured by higher layers or dynamically indicated via downlink control information ("DCI") using a transmission configuration indicator ("TCI") state indication.

15. The UE of claim 13, wherein the QCL type-D assumption for PRS resources is indicated by configuring a source reference signal ("RS"), wherein the source RS is one of: a channel state information RS ("CSI-RS"), a synchronization signal block ("SSB"), a sounding reference signal ("SRS"), or a PRS.

16. The UE of claim 15, wherein the source RS is a CSI-RS with group-based beam reporting enabled, wherein the QCL type-D assumption for PRS resources is assumed based on how a PRS resource identifier ("ID") is quasi-co-located with a CSI-RS resource ID.

17. The UE of claim 12, wherein the PRS resources in the PRS resource set correspond to a same base station, and wherein each PRS resource ID corresponds to a single transmit beam of the same base station.

18. The UE of claim 11, wherein the at least one processor is configured to cause the UE to:

receive an indication in downlink control information ("DCI"); and generate the first single positioning measurement report or the second single positioning measurement report based on receiving the indication in the DCI.

* * * * *